United States Patent
Yuasa (10) Patent No.: US 7,190,104 B2
(45) Date of Patent: Mar. 13, 2007

(54) DEVICE AND METHOD UTILIZING ELECTROMECHANICAL CONVERSION ELEMENT

(75) Inventor: Tomoyuki Yuasa, Sakai (JP)

(73) Assignee: Konica Minolta Opto, Inc., Hachioji (JP)

( * ) Notice: Subject to any disclaimer, the term of this patent is extended or adjusted under 35 U.S.C. 154(b) by 141 days.

(21) Appl. No.: 11/109,323

(22) Filed: Apr. 19, 2005

(65) Prior Publication Data
US 2005/0242685 A1 Nov. 3, 2005

(30) Foreign Application Priority Data
Apr. 23, 2004 (JP) ............... 2004-127872

(51) Int. Cl.
*H01L 41/08* (2006.01)
(52) U.S. Cl. ................................. 310/317; 310/323.02
(58) Field of Classification Search ........... 310/316.01, 310/316.02, 317, 323.02
See application file for complete search history.

(56) References Cited

U.S. PATENT DOCUMENTS

| | | | | |
|---|---|---|---|---|
| 5,589,723 | A * | 12/1996 | Yoshida et al. | 310/328 |
| 6,218,764 | B1 | 4/2001 | Yoshida et al. | 310/317 |
| 6,249,093 | B1 * | 6/2001 | Takahata et al. | 318/129 |
| 6,320,298 | B1 * | 11/2001 | Kawabe | 310/317 |
| 6,512,321 | B2 * | 1/2003 | Yoshida et al. | 310/316.01 |
| 6,703,762 | B1 * | 3/2004 | Okada | 310/317 |
| 6,717,329 | B2 * | 4/2004 | Yoshida et al. | 310/316.02 |
| 6,876,126 | B2 * | 4/2005 | Okada | 310/317 |

FOREIGN PATENT DOCUMENTS

| JP | 9-191676 A | 7/1997 |
|---|---|---|
| JP | 11-98865 A | 4/1999 |
| JP | 2004-48902 A | 2/2004 |

* cited by examiner

*Primary Examiner*—Mark Budd
(74) *Attorney, Agent, or Firm*—Sidley Austin LLP (57) ABSTRACT

To provide a driving device, utilizing an electromechanical conversion element, having a driving pulse generating means capable of generating a sawtooth waveform driving voltage with a simple circuit configuration. The driving device includes: an electromechanical conversion element which is connected to the driving pulse generating means and extends and contracts, and one end of which in an extension/contraction direction is fixed; a rod, one end of which is fixed to the other end in an extension/contraction direction of the electromechanical conversion element; and a moving body, frictionally coupled to the periphery of the rod, moving along the rod corresponding to the vibration of the rod due to the extension/contraction of the electromechanical conversion element. In this device, four voltage values increasing sequentially in steps are applied cyclically to the electromechanical conversion element, and by the resulting sawtooth vibration displacement caused in the rod, the moving body is driven in one direction along the rod. Further, four voltage values decreasing sequentially in steps are applied cyclically, and by the resulting sawtooth vibration displacement caused in the rod, the moving body is driven in a direction opposite the one direction along the rod.

7 Claims, 6 Drawing Sheets

DEVICE AND METHOD UTILIZING ELECTROMECHANICAL CONVERSION ELEMENT

CROSS REFERENCE TO RELATED APPLICATION

The present application claims priority to Japanese Patent Application No. 2004-127872 filed Apr. 23, 2004, the entire contents of which are hereby incorporated by reference.

BACKGROUND OF THE INVENTION

1. Field of the Invention

The present invention relates to a driving device, and in detail, to a driving device and a driving method utilizing an electromechanical conversion element such as a piezoelectric element. A driving device of the present invention is suitable for a lens driving mechanism in a camera and a driving mechanism of a precision stage, for example.

2. Description of the Related Art

Recently, a driving device using a piezoelectric element is proposed for driving a member constituting precision equipment such as a camera and an information recording/reproducing device. Such a device is so configured that by utilizing a phenomenon of a piezoelectric element causing a distortion in a lengthwise direction when a voltage is applied, an impulse voltage is applied to the piezoelectric element so as to give an impact force to an inertial body movably engaging with the piezoelectric element, whereby a driven body is driven by utilizing the motion of the inertial body caused by the continuous impact force.

Figures 1A, 1B:
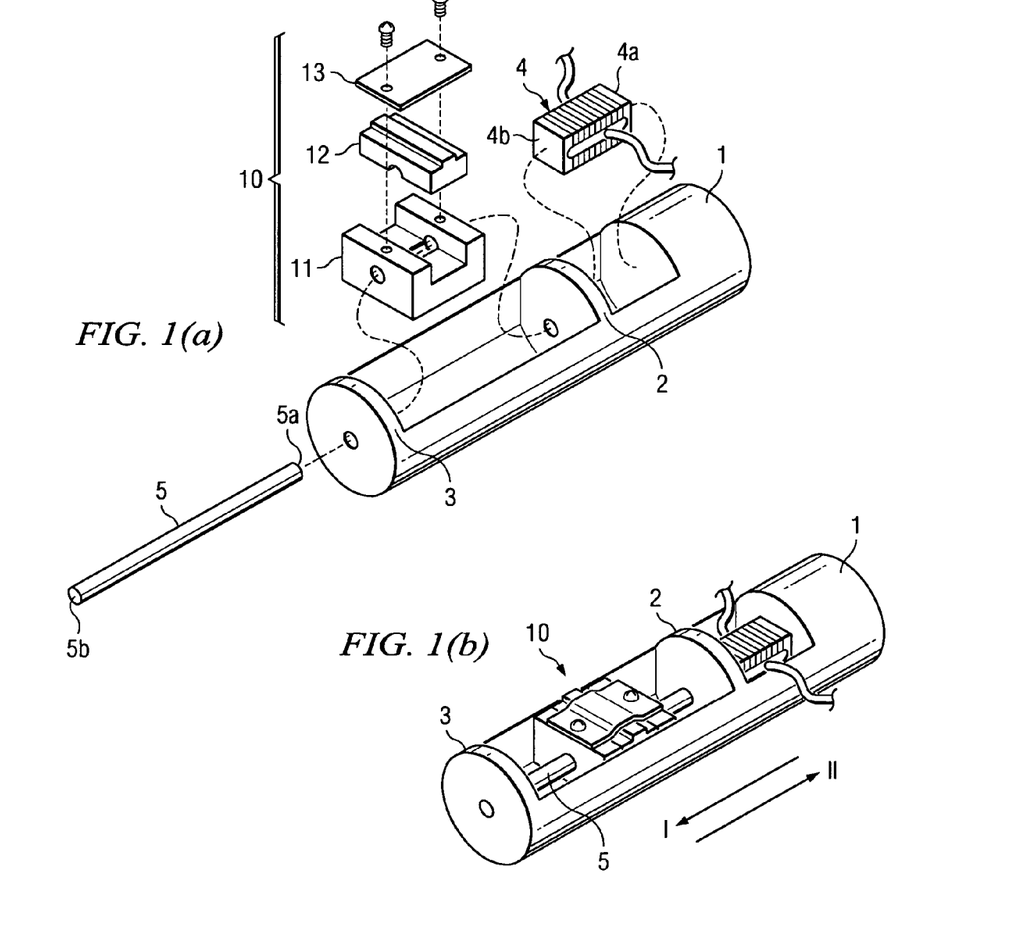
FIGS. 1(a) and 1(b) are exploded perspective view and assembly diagram showing a conventional driving device.

Japanese Patent Application Laid-open No. 11-98865 shows a driving device utilizing an electromechanical conversion element such as a piezoelectric element in which the length changes (extends and contracts) when a voltage is applied, in an exploded perspective view of FIG. 1(a) and an assembly perspective view of FIG. 1(b), for example.

This driving device is capable of moving a moving body 10 relatively to a fixed member 1, and can be used as a lens driving device of a camera, for example. That is, when the moving body 10 is coupled to a lens frame, it is possible to move a lens together with the moving body 10.

A piezoelectric element 4 is composed of a number of laminated piezoelectric plates. One end 4a thereof in an extension/contraction direction is fixed to the fixed member 1, and the other end 4b is fixed to a first end 5a of a rod 5. The rod 5 is supported slidably by supporting parts 2 and 3 integrally formed with the fixed member 1.

The moving body 10 is frictionally coupled around the rod 5 in such a manner that the rod 5 is interposed between a body 11 and a cap 12, and the body 11 and the cap 12 are given an energizing force by a press spring 13 in an interposing direction.

Figure 2:
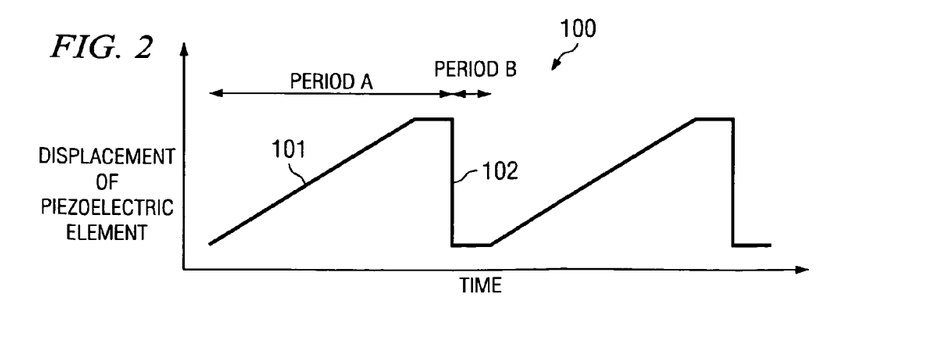
FIG. 2 is a graph explaining the driving principle of the driving device of FIGS. 1(a) and 1(b)

The piezoelectric element 4 is connected with a voltage control circuit (a driving pulse generating means) not shown. When a predetermined driving voltage of a sawtooth waveform is applied to the piezoelectric element 4, the piezoelectric element 4 vibrates with a sawtooth displacement of the almost same form (FIG. 2). Along with it, the rod 5 also vibrates in a lengthwise direction thereof with a sawtooth displacement. That is, the graph of FIG. 2 shows the vibration displacement of the piezoelectric element 4 as well as the vibration displacement of the rod 5.

Specifically, at a gently rising slope part 101 in a period A of a first waveform 100, the piezoelectric element 4 extends relatively slowly, and the rod 5 moves slowly in the arrow I direction in FIG. 1(b). Next, in a period B, the piezoelectric element 4 contracts quickly so as to return to be in the initial length (a waveform portion shown by the rising slope part 102), and the rod 5 rapidly moves to the arrow II direction. Like movements are repeated, and consequently, the rod 5 vibrates while repeating slow movements in the I direction and rapid movements in the II direction. In this way, the rod 5 vibrates while forming slow and rapid sawtooth vibration waveforms as shown in FIG. 2.

Figure 3:
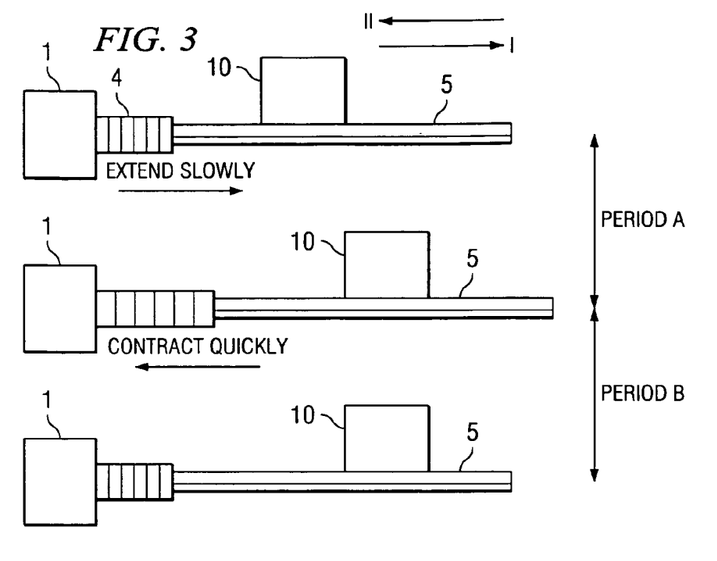
FIG. 3 is a diagram explaining the driving principle of the driving device of FIGS. 1(a) and 1(b)

Here, as shown in FIG. 3, the elastic force of the press spring 13 of the moving body 10 (frictionally coupling force of the moving body 10 to the rod 5) is regulated such that the moving body 10 moves together with the rod 5 when the rod 5 moves slowly, and the moving body 10 remains at the position due to the inert (or moves a smaller amount than the rod 5) when the rod 5 moves rapidly. Therefore, during the vibration of the rod 5, the moving body 10 moves in the I direction relatively to the fixed member 1.

Note that when moving the moving body 10 in the arrow II direction in FIG. 1(b), the vibration waveforms of the piezoelectric element 4 and the rod 5 should be opposite to those shown in FIG. 2, that is, the waveform should consist of a sharp rising part and a gentle falling part. The moving principle of the moving body 10 is same as that described above.

As described above, although it is required to apply a driving voltage of a sawtooth waveform to the piezoelectric element, Japanese Patent Application Laid-open No. 11-98865 discloses two methods of generating such a driving voltage.

Figure 4A:
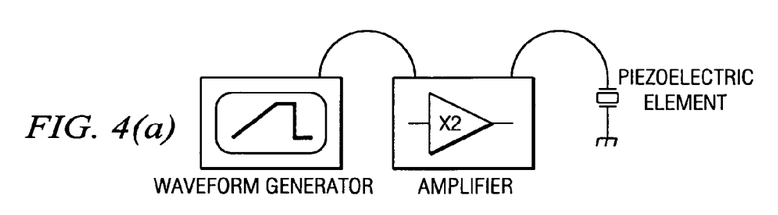
FIGS. 4(a), 4(b) and 4(c) are diagrams explaining a conventional method of generating a sawtooth driving voltage.
Figure 4B:
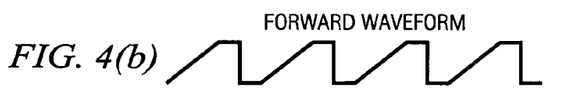
Figure 4C:
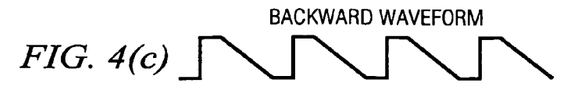

A first method is one using a waveform generator and an amplifier, as shown in FIGS. 4(a), 4(b) and 4(c). As shown in FIG. 4(a), a sawtooth waveform of 8 bits, 0–5 V is generated by DA conversion of the waveform generator, which is amplified to 1–10 V by using a power amplifier. In this way, a sawtooth driving waveform of 0–10 V is obtained. FIG. 4(b) shows a driving voltage waveform for moving the moving body 10 in the I direction in FIG. 3, and FIG. 4(c) shows a driving voltage waveform for driving it in the opposite direction.

Figure 5A:
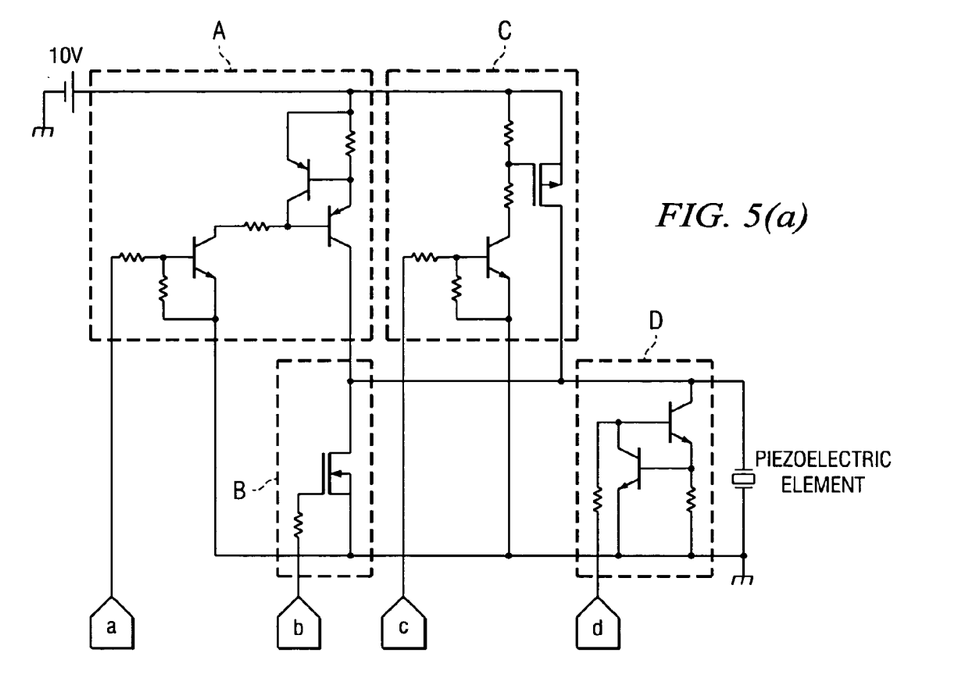
FIGS. 5(a) and 5(b) are diagrams explaining a conventional method of generating a sawtooth driving voltage.
Figure 5B:
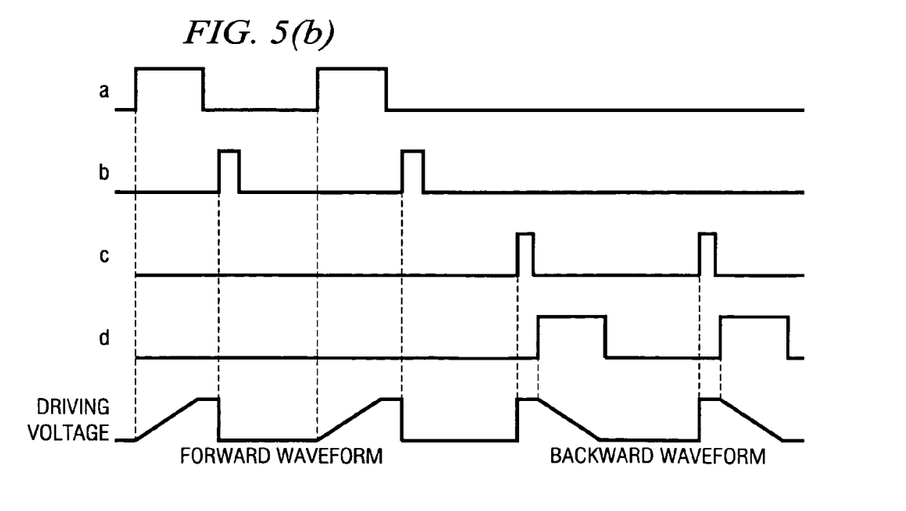

A second method is one using a constant current circuit and a switching circuit, as shown in FIGS. 5(a) and 5(b). In a digital circuit shown in FIG. 5(a), A and D constitute constant current circuits, and B and C constitute switching circuits. To this digital circuit, a signal shown in FIG. 5(b) is given to terminals a to d. Thereby, the constant current circuits A and D and the switching circuits B and C are activated in turn, so that a sawtooth driving waveform of 0–10 V is obtained. As described above, in order to obtain a sawtooth driving voltage waveform, it is required conventionally to use a waveform generator and an amplifier, or to use a constant current circuit and a switching means. Therefore, the configuration is complicated, causing a cost increase.

SUMMARY OF THE INVENTION

An object of the present invention is to provide a driving device, utilizing an electromechanical conversion element, having a driving pulse generating means capable of generating a sawtooth driving voltage with a simple circuit configuration.

The present invention is developed to effectively solve the aforementioned problems, and is to provide a driving device and a driving method utilizing an electromechanical conversion element having the following features.

A driving device of the present invention comprises an electromechanical conversion element which extends and contracts when a voltage generated in a driving pulse generating means is applied, and one end of which in an extension/contraction direction is fixed; a rod, one end of which is fixed to the other end in an extension/contraction direction of the electromechanical conversion element; and a moving body, frictionally coupled to the periphery of the rod, moving along the rod corresponding to the vibration of the rod due to the extension/contraction of the electromechanical conversion element.

In this device, the driving pulse generating means cyclically applies three or more voltage values, increasing sequentially in steps, to the electromechanical conversion element, and by the resulting sawtooth vibration displacement generated in the rod, drives the moving body in one direction along the rod. Further, the driving pulse generating means cyclically applies three or more voltage values, decreasing sequentially in steps, to the electromechanical conversion element, and with the resulting sawtooth vibration displacement generated in the rod, drives the moving body in a direction opposite the above-described one direction along the rod. Particularly, the number of stepwise voltage values are preferably four.

Further, the present invention provides a method of driving a moving body in a driving device comprising: an electromechanical conversion element which extends and contracts when a voltage is applied, and one end of which in an extension/contraction direction is fixed; a rod, one end of which is fixed to the other end in an extension/contraction direction of the electromechanical conversion element; and a moving body, frictionally coupled to the periphery of the rod, moving along the rod corresponding to the vibration of the rod due to the extension/contraction of the electromechanical conversion element.

In the method of the present invention, a voltage value increasing sequentially in steps is applied to the electromechanical conversion element cyclically, and by the resulting sawtooth vibration displacement generated in the rod, the moving body is driven in one direction along the rod. Further, a voltage value decreasing sequentially in steps is applied cyclically to the electromechanical conversion element, and by the resulting sawtooth vibration displacement generated in the rod, the moving body is driven in a direction opposite the above-described one direction along the rod.

In the driving device and the driving method of the present invention, the driving pulse generating means applying a driving voltage to the electromechanical conversion element applies a simple constant voltage value to the electromechanical conversion element while sequentially changing the magnitude of the voltage value in steps. Therefore, the control is simple and the circuit configuration is simplified, enabling to suppress the cost.

The invention itself, together with further objects and attendant advantages, will best be understood by reference to the following detailed description taken in conjunction with the accompanying drawings.

BRIEF DESCRIPTION OF THE DRAWINGS

FIGS. 7(a-1), 7(a-2), 7(b-1) and 7(b-2) are graphs showing control signals to the driving circuit of FIG. 6 and voltages applied to the piezoelectric element;

In the following description, like parts are designated by like reference numbers throughout the several drawings.

DETAILED DESCRIPTION OF THE PREFERRED EMBODIMENT

An embodiment of the present invention will be described below in detail with reference to the accompanying drawings.

Figure 6:
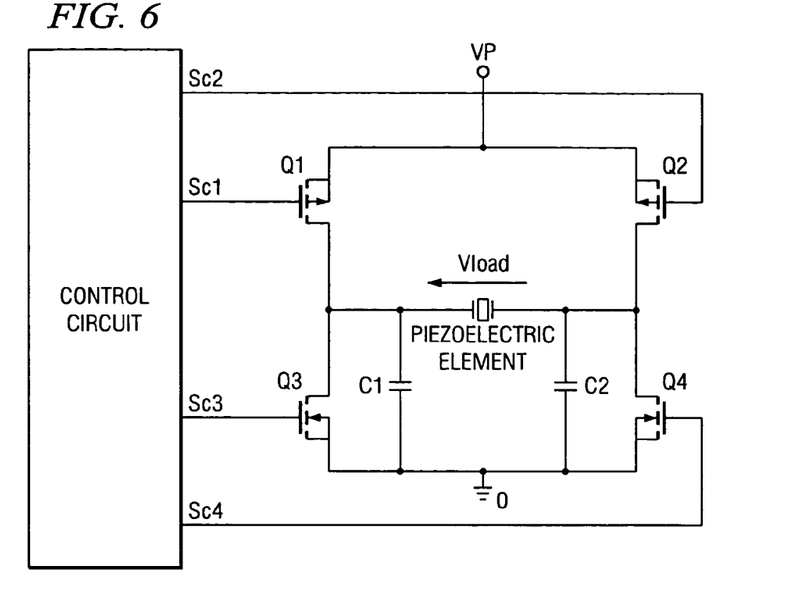
FIG. 6 is a circuit diagram showing an exemplary driving circuit of the present invention.

FIG. 6 shows a circuit configuration (driving pulse generating means) for applying voltages to a piezoelectric element in a driving device of the present invention. In the driving device of the present invention, the configuration of the mechanical part is same as that of the conventional example shown in FIG. 1(a), but the configuration of the driving circuit is different from the conventional one.

That is, in the embodiment shown, the piezoelectric element 4 of FIG. 1(a) is driven by using the driving circuit of FIG. 6. In FIG. 6, an H bridge circuit is composed of four switches Q1 to Q4, two capacitors C1 and C2, and a piezoelectric element. The switches Q1 and Q2 consist of P-channel MOSFETs, and the switches Q3 and Q4 consist of N-channel MOSFETs.

The switch Q1 is so configured that the source is connected to a Vp terminal and the gate is connected to an Sc1 terminal of the control circuit. The switch Q2 is so configured that the source is connected to the Vp terminal, and the gate is connected to an Sc2 terminal of the control circuit. The switch Q3 is so configured that the drain is connected to the drain side of the switch Q1, and the source side is grounded. Further, the gate of the switch Q3 is connected to an Sc3 terminal of the control circuit. The switch Q4 is so configured that the drain is connected to the drain side of the switch Q2, and the source side is grounded. Further, the gate of the switch Q4 is connected to an Sc4 terminal of the control circuit.

In the piezoelectric element, on end thereof is connected between the drains of the switches Q1 and Q3, and the other end is connected between the drains of the switches Q2 and Q4. Further, the capacitors C1 and C2 are connected in series to the switch Q3 and the switch Q4, respectively, as shown in the Fig. The both capacitors C1 and C2 have the same capacitance as that of the piezoelectric element.

Figure 7:
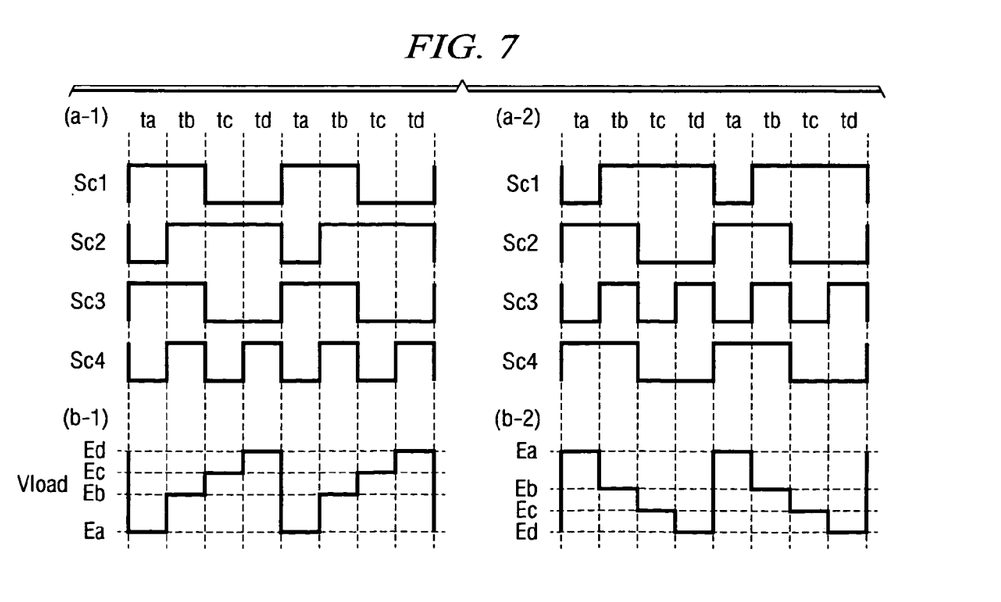

In the driving circuit of FIG. 6, when the gate voltages of the switches Q1 to Q4 are controlled by a signal from the control circuit as shown FIG. 7(*a*-1), driving voltages (Ea, Eb, Ec, Ed) applied to the piezoelectric element form stepwise waveforms as shown in FIG. 7(*b*-1). As obvious from the Fig., ta to td show voltage applying periods respectively, in which the periods ta to td constitute one cycle.

In the period ta, the switches Q2 and Q3 are turned on, and the switches Q1 and Q4 are turned off. On the other hand, in the period td, the switches Q1 and Q4 are turned on, and the switches Q2 and Q3 are turned off. Therefore, in the periods ta and td, voltages applied to the piezoelectric element have the same absolute value but opposite signs. When a voltage of 3 V is applied to the Vp terminal, assuming the driving voltage applied to the piezoelectric element being Ea=−3 V, Ed=+3 V.

In the period tb, the both switches Q1 and Q2 are turned off, so Eb=0.

Further, in the period tc, only the switch Q1 is turned on, and the capacities of the piezoelectric element and the two capacitors C1 and C2 are same, so Ec=0.5Ed=+1.5 V.

Accordingly, by repeating the cycles of ta to td, stepwise driving voltages as shown in FIG. 7(*b*-1) are applied to the piezoelectric element cyclically.

FIGS. 7(*a*-2) and 7(*b*-2) show respective gate voltages and corresponding driving voltages when driving in a direction opposite the above-described direction.

Figure 8:
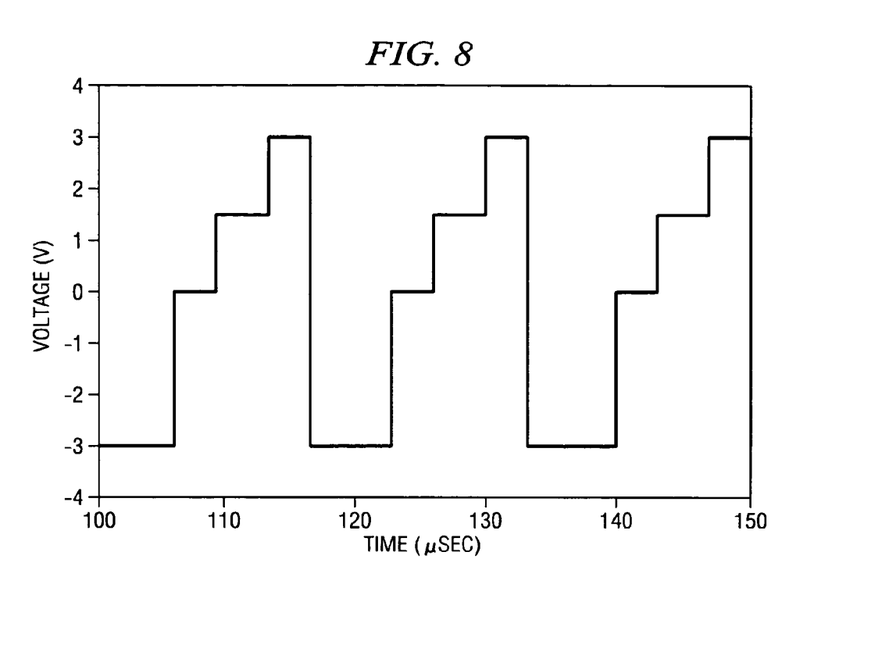
FIG. 8 is a graph showing an exemplary waveform of a driving voltage applied to the piezoelectric element by the driving circuit of FIG. 6.

FIG. 8 is a graph showing a driving voltage assuming that applying periods in FIG. 7(*a*-1) are as follows: ta=1.0T and tb=tc=td=0.5T. Here, since the resonant frequency 1/T (T=cycle) of the physical system of the mechanism part (electromechanical conversion element and rod) shown in FIG. 1 is 150 kHz, T=1/150000=6.66 μsec. That is, ta=1.0T=6.66 μsec, and tb=tc=td=0.5T=3.33 μsec.

Figure 9:
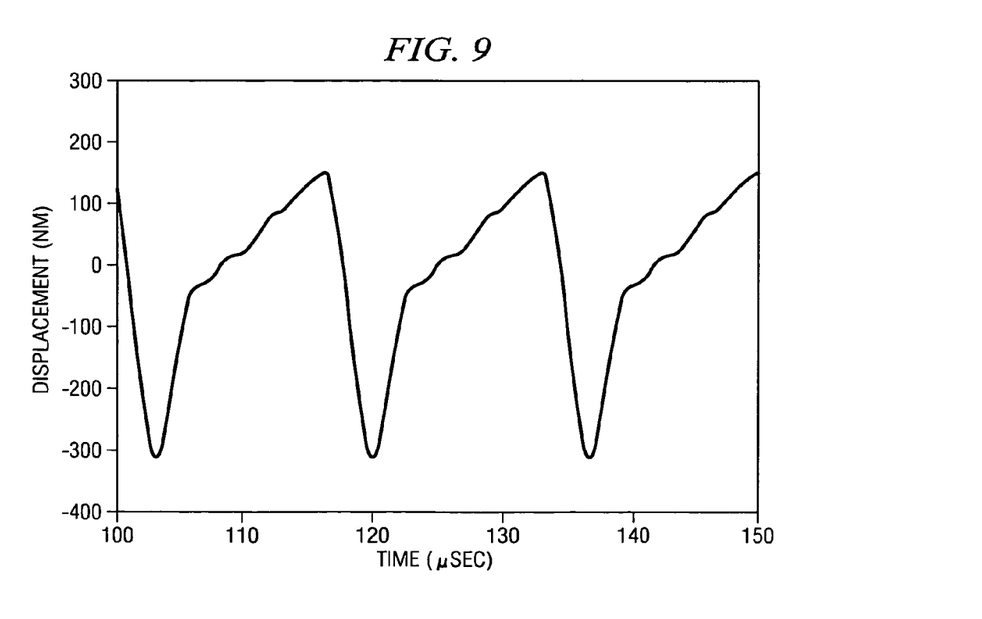
FIG. 9 is a graph showing a displacement of the rod when the driving voltage shown in FIG. 8 is applied.

FIG. 9 shows a displacement of the rod when the driving voltage of FIG. 8 is applied. A sawtooth rod vibration displacement substantially corresponding to the stepwise waveform of FIG. 8 is realized.

As obvious from the above, in the present invention, a voltage of simple constant value is applied in each period, and by sequentially changing the value of such a constant voltage, a sawtooth rod vibration displacement is achieved.

Note that in the present invention, it is sufficient to obtain a stepwise fluctuation waveform shown in FIG. 8 as a driving voltage to the piezoelectric element. Therefore, a specific circuit configuration and switching elements used therein are not limited to those shown in FIG. 6.

Although the stepwise waveform consists of four voltage values in the example shown, three voltage values or more than five voltage values may be used. However, in view of obtaining an appropriate rod vibration displacement with a simple circuit configuration, four voltage values are preferably used.

The thrust in a case of driving by using the aforementioned driving circuit was measured by changing the combination of applying periods in various ways. Measurement data was obtained by measuring the thrust of the moving body 10 in FIG. 1 by a load cell.

Figure 10:
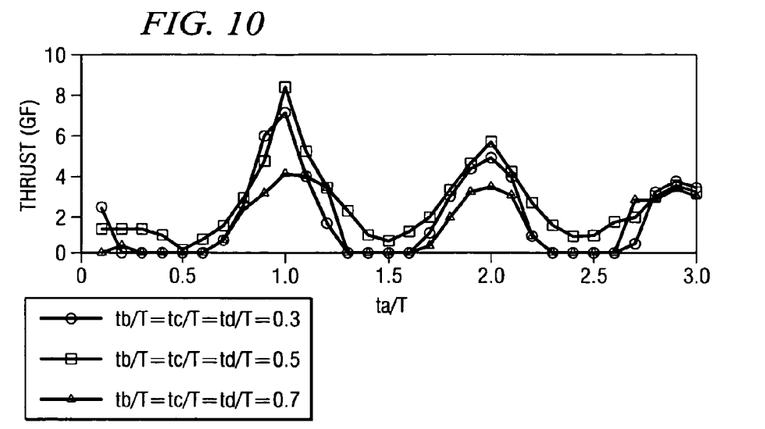
FIG. 10 is a graph showing changes in thrust when a driving voltage applying period is changed in various ways.

A graph of FIG. 10 shows data in a case where tb, tc and td were kept constant equally and only ta was changed. Here, T=6.66 μsec is also established.

In FIG. 10, measurements were carried out by changing ta in three cases where "tb/T=tc/T=td/T=0.3", "tb/T=tc/T=td/T=0.5", and "tb/T=tc/T=td/T=0.7", respectively. The following results are found in the graph.

Maximum values exist around ta/T=1.0, 2.0 and 3.0. From the graph, it is considered that around ta/T=1.0, a relatively fine thrust is obtained at 0.7<ta/T<1.3. Similarly, around ta/T=2.0, it is considered that a relatively fine thrust is obtained at 1.7<ta/T<2.3.

Note that what level of thrust being required depends on the mass and the like of a driving subject. However, it is true that larger the thrust is, wider the application rage becomes.

Further, from the result shown in the graph, it is expected that maximum values may exist at ta/T=4.0, 5 . . . . When mathematizing the result described above, assuming n being 0 or a positive integer, it is expected that a fine thrust is obtained when (n+1)T−0.3T<ta<(n+1)T+0.3T is satisfied.

Note that the experimentation relating to FIG. 10 was carried out for a case where the moving body 10 was moved in a driving direction (arrow I direction in FIG. 3) corresponding to FIGS. 7(*a*-1) and 7(*b*-1). Further, ta is an applying period of the minimum voltage value Ea among the four voltage values (Ea, Eb, Ec and Ed indicated in an ascending order).

In contrast, when moving the moving body 10 in a direction opposite the above-described direction, a similar result is expected by assuming that an applying period of the maximum voltage value Ea among the four voltage values Ea, Eb, Ec and Ed in a descending order is ta, since the sawtooth rod vibration waveform is only reversed in a right and left direction.

Figure 11:
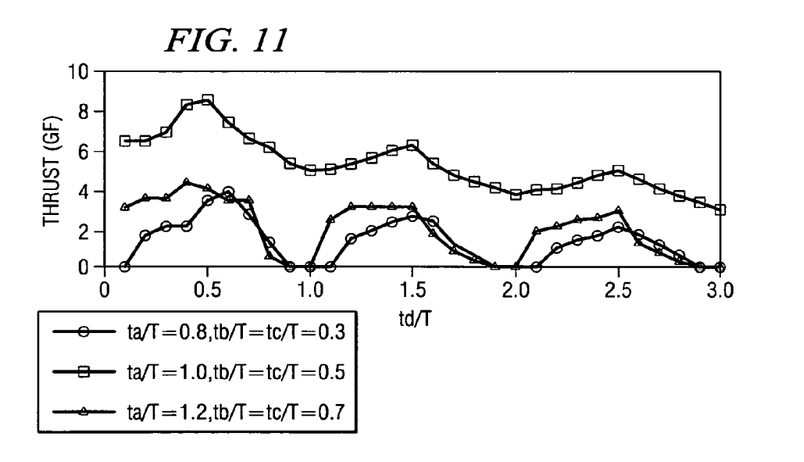
FIG. 11 is a graph showing changes in thrust when a driving voltage applying period is changed in various ways.

A graph of FIG. 11 shows data in a case where only td was changed. Here, T=6.66 μsec is also established. In FIG. 11, measurements were carried out by changing td for three cases where "ta/T=0.8, tb/T=tc/T=0.3", "ta/T=1.0, tb/T=tc/T=0.5" and "ta/T=1.2, tb/T=tc/T=0.7".

Maximum values exist around td/T=0.5, 1.5 and 2.5. From the graph, it is considered that around td/T=0.5, a relatively fine thrust is obtained at 0.2<td/T<0.8. Similarly, it is considered that around td/T=1.5, a relatively fine thrust is obtained at 1.2<ta/T<1.8.

Further, from the result shown in the graph, it is expected that maximum values also exist at td/T=3.5, 4.5 . . . . When mathematizing the result described above, assuming m being 0 or a positive integer, it is expected to obtain a fine thrust when (m+0.5)T−0.3T<td<(m+0.5)T+0.3T is satisfied.

Note that the experimentation relating to FIG. 11 was carried out for a case where the moving body 10 was moved in a driving direction (arrow I direction in FIG. 3) corresponding to FIGS. 7(*a*-1) and 7(*b*-1). Further, td is an applying period of the maximum voltage value Ed among the four voltage values (Ea, Eb, Ec and Ed indicated in an ascending order).

In contrast, when moving the moving body 10 in a direction opposite the above-described direction, a similar result is expected by assuming that an applying period of the minimum voltage value Ed among the four voltage values Ea, Eb, Ec and Ed in a descending order is td, since the sawtooth rod vibration waveform is only reversed in a right and left direction.

Figure 12:
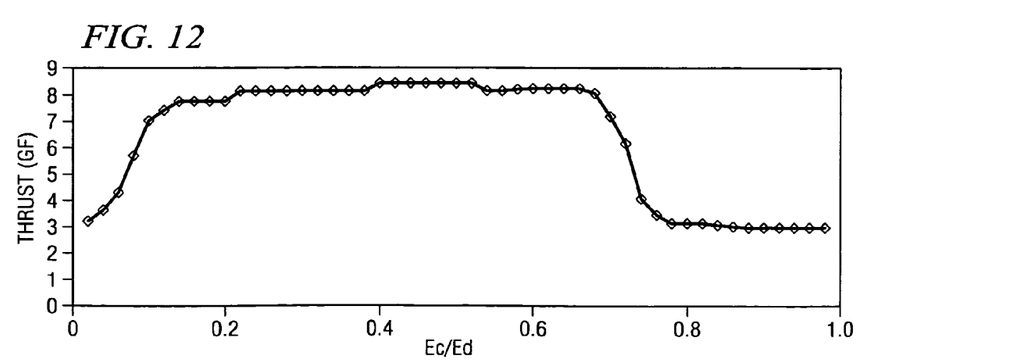
FIG. 12 is a graph showing changes in thrust when the ratio of driving voltages is changed in various ways.

FIG. 12 shows a result of measuring the thrust of the moving body by changing Ec/Ed, when ta=1.0T (=6.66 μsec), tb=tc=td=0.5T (=3.33 μsec), Ea=−3 V, Eb=0 V, and Ed=+3 V. From the graph, it is found that the highest thrust is obtained when Ec=0.5Ed. However, 0.1Ed<Ec<0.7Ed is considered to be sufficient from the graph.

In FIG. 6, Ec=0.5Ed when the both capacities C1 and C2 of the capacitances are equal to the capacity of the piezoelectric element (that is, assuming the capacity of the piezoelectric element being Cpiezo, C1=C2=Cpiezo). However, if a capacitor with such a capacity cannot be obtained, it is possible to obtain a fine thrust by using a capacitor satisfying 0.1Ed<Ec<0.7Ed.

Note that although Ea=−3 V, Eb=0 V and Ed=+3 V in the experimentation relating to FIG. 12, it is expected to obtain a similar result provided that, assuming the four voltage values Ea, Eb, Ec and Ed are in an ascending order, the minimum value (Ea) and the maximum value (Ed) have the same absolute value but opposite signs, Eb=0, and the ratio of Ec and Ed Ec/Ed is in the range described above.

Further, this experimentation was carried out when the moving body 10 is moved in a driving direction (arrow I direction in FIG. 3) corresponding to FIGS. 7(a-1) and 7(b-1), and the four voltage values Ea, Eb, Ec and Ed are indicated in an ascending order.

In contrast, when moving the moving body 10 in a direction opposite the above-described direction, a similar result is expected by considering the four voltage values indicated as Ea, Eb, Ec and Ed in a descending order, since the sawtooth rod vibration waveform is only reversed in a right and left direction.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A driving device comprising:
   an electromechanical conversion element which extends and contracts when a voltage generated in a driving pulse generating device is applied;
   a rod, one end of which is fixed to the other end in an extension direction of the electromechanical conversion element; and
   a moving body, frictionally coupled to the periphery of the rod, moving along the rod corresponding to the vibration of the rod due to the extension of the electromechanical conversion element,
   wherein the driving pulse generating device cyclically applies three or more voltage values which increase sequentially in steps to the electromechanical conversion element so as to drive the moving body in one direction along the rod, and cyclically applies three or more voltage values which decrease sequentially in steps to the electromechanical conversion element so as to drive the moving body in a direction opposite to the one direction along the rod.

2. A driving device of claim 1, wherein the three or more voltage values are four ones.

3. A driving device of claim 2, wherein the following inequality is satisfied, $$(n+1)T-0.3T < ta < (n+1)T+0.3T,$$

n: positive integer or zero, where ta is the applying period of the minimum voltage value in case of applying increasing sequentially four voltage values, or the applying period of the maximum voltage value in case of applying increasing sequentially four voltage values, and T is the resonant frequency of the physical system of the mechanism part comprising the electromechanical conversion element and the rod.

4. A driving device of claim 2, wherein the following inequality is satisfied, $$(m+0.5)T-0.3T < td < (m+0.5)T+0.3T,$$

m: positive integer or zero, where td is the applying period of the maximum voltage value in case of applying increasing sequentially four voltage values, or the applying period of the minimum voltage value in case of applying increasing sequentially four voltage values, and T is the resonant frequency of the physical system of the mechanism part comprising the electromechanical conversion element and the rod.

5. A driving device of claim 2, wherein following conditions are satisfied, $$Ea=-Ed,$$

$$Eb=0,$$

$$0.1Ed < Ec < 0.7Ed,$$

where Ea, Eb, Ec and Ed indicated in an ascending order, or Ea, Eb, Ec and Ed indicated in a descending order.

6. A driving method for running a driving device which comprises:
   an electromechanical conversion element which extends and contracts when a voltage is applied;
   a rod, one end of which is fixed to the other end in an extension direction of the electromechanical conversion element; and
   a moving body, frictionally coupled to the periphery of the rod, moving along the rod corresponding to the vibration of the rod due to the extension of the electromechanical conversion element,
   wherein the driving method comprising the steps of:
   cyclically applying sequential increasing step voltages to the electromechanical conversion element so as to drive the moving body in one direction along the rod;
   cyclically applying sequential decreasing step voltages to the electromechanical conversion element so as to drive the moving body in the direction opposite to the one direction along the rod.

7. A driving method of claim 6, wherein each number of the sequential increasing step voltages and the sequential decreasing step voltages is four.

* * * * *